(12) United States Patent
Beckert et al.

(10) Patent No.: US 6,499,078 B1
(45) Date of Patent: Dec. 24, 2002

(54) INTERRUPT HANDLER WITH PRIORITIZED INTERRUPT VECTOR GENERATOR

(75) Inventors: Richard D. Beckert, Lake Stevens, WA (US); Mark M. Moeller, Bellingham, WA (US); Patrick Mullarky, Belleve, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/357,064

(22) Filed: Jul. 19, 1999

(51) Int. Cl.[7] .............................. G06F 9/48; G06F 13/26
(52) U.S. Cl. ..................... 710/260; 710/262; 710/266
(58) Field of Search .................................. 710/260, 264, 710/266, 269, 1, 48, 49, 52, 262; 701/1; 700/1

(56) References Cited

U.S. PATENT DOCUMENTS

| | | | | |
|---|---|---|---|---|
| 4,734,882 A | * | 3/1988 | Romagosa | |
| 5,225,974 A | * | 7/1993 | Mathews et al. | |
| 5,487,002 A | * | 1/1996 | Diller et al. | |
| 5,594,905 A | | 1/1997 | Mital | 395/733 |
| 5,894,578 A | * | 4/1999 | Qureshi et al. | |
| 5,923,887 A | * | 7/1999 | Dutton | |

* cited by examiner

Primary Examiner—Gopal C. Ray
(74) Attorney, Agent, or Firm—Lee & Hayes, PLLC

(57) ABSTRACT

A hardware-implemented interrupt handler external to a processor handles interrupts destined for the processor. The interrupt handler has a programmable prioritized interrupt array with programmable registers that identify priority levels and handling processes for handling one or more interrupts. The interrupt handler also has an interrupt scanning state machine that scans the prioritized interrupt following receipt of an interrupt to extract the priority level and handling process associated with the interrupt. The interrupt handler is designed to handle interrupts in significantly less time than software implementations, thereby making the handler favorable for real time systems.

28 Claims, 4 Drawing Sheets

INTERRUPT HANDLER WITH PRIORITIZED INTERRUPT VECTOR GENERATOR

TECHNICAL FIELD

This invention relates to interrupt handlers and methods for handling interrupts. More particularly, this invention relates to interrupt handlers with prioritized interrupt vector generators that enable configuration of interrupt type and priority among the interrupts.

BACKGROUND

An "interrupt" is a request-for-attention signal that is passed to a computer's CPU (central processing unit) from hardware or software sources in an attempt to gain the CPU's attention. Interrupts can occur for many reasons, ranging from normal to highly abnormal situations, including service requests from hardware, errors in processing, program attempts to do the impossible, and memory problems. A hardware interrupt is a request for service generated by hardware components, such as a keyboard, mouse, disk drive, I/O port, and microprocessor.

The interrupt causes the CPU to suspend its current operations, save the status of its work, and transfer control to a process for handling the interrupt. Interrupt handlers are commonly implemented in software and more particularly, in a hardware abstraction layer. The interrupt handler typically resides in the CPU at a known address. When an interrupt occurs, the CPU begins executing code at that location. The interrupt handler determines the cause of the interrupt and then services it by calling an appropriate set of instructions to be carried out.

The interrupt handler initiates different instructions for different types of interrupts. More specifically, each type of interrupt has an associated dedicated routine, known as an "interrupt service routine" or "ISR". When a CPU receives interrupt requests from more than one source, the interrupt handler invokes a hierarchy of permission levels, called "interrupt priorities", to determine which of the interrupts is handled first.

Conventional software-based interrupt handlers have a drawback in that the speed and performance is often unacceptable in real-time operating systems that are required to execute interrupts at very high speed and efficiency. The performance factor is further complicated by the desire to handle prioritized sets of interrupts from many diverse hardware platforms. Different hardware platforms often have different interrupts and dissimilar interrupt priorities. To be acceptable, an interrupt handler should provide real-time response for hardware interrupts and dynamic setting of interrupt priorities.

One prior art interrupt handler that addresses these issues is described in U.S. Pat. No. 5,594,905, entitled "Exception Handler and Method for Handling Interrupts", which issued Jan. 14, 1997 in the name of Amit Mital, and is assigned to Microsoft Corporation.

While this interrupt handler proved effective, the inventors sought to develop an even faster, hardware-based interrupt handler that minimizes software overhead to thereby improve performance.

SUMMARY

This invention concerns an interrupt handler implemented in hardware and external to a processor to handle interrupts destined for the processor. The interrupt handler has a programmable prioritized interrupt array with programmable registers that identify priority levels and handling processes for handling one or more interrupts. The interrupt handler also has an interrupt scanning state machine that scans the prioritized interrupt array following receipt of an interrupt to extract the priority level and handling process associated with the interrupt. The interrupt handler is designed to handle interrupts in significantly less time than software implementations, thereby making the handler favorable for real time systems.

According to one implementation, the prioritized interrupt array has three registers that coordinate data associated with the interrupts received by the interrupt handler. A mask register holds mask values for corresponding interrupts that indicate whether the interrupts are enabled. A priority register holds priority levels for the various interrupts, whereby two or more interrupts may be assigned the same priority level. An address register holds information for servicing the interrupts, such as addresses for interrupt service routines. The priority register and address register are programmable to enable a user to change the priority levels and servicing information for any given interrupt source.

The interrupt scanning state machine operates on the prioritized interrupt array using a three-state process that includes an idle state, a scanning state, and an interrupt selected state. The state machine remains in the idle state until the prioritized interrupt array receives one or more active interrupts that are indicated by the mask register as being enabled. When one or more active interrupts are received, the interrupt scanning state machine transitions to the scanning state to scan the priority register and identify which of the one or more active interrupts has the highest priority. When the interrupt with the highest priority is found, the interrupt scanning state machine transitions to the interrupt selected state and accesses the address register to output information for handling the active interrupt with the highest priority.

The interrupt handler is designed to be extendable. As an example, two or more handlers can be connected in a cascading arrangement where the output of one interrupt handler supplies its highest priority interrupt as one of the many interrupts to another interrupt handler.

BRIEF DESCRIPTION OF THE DRAWINGS

The same-reference numbers are used throughout the disclosure to reference like components and features.

CONCLUSION

Exemplary System

Figure 1:
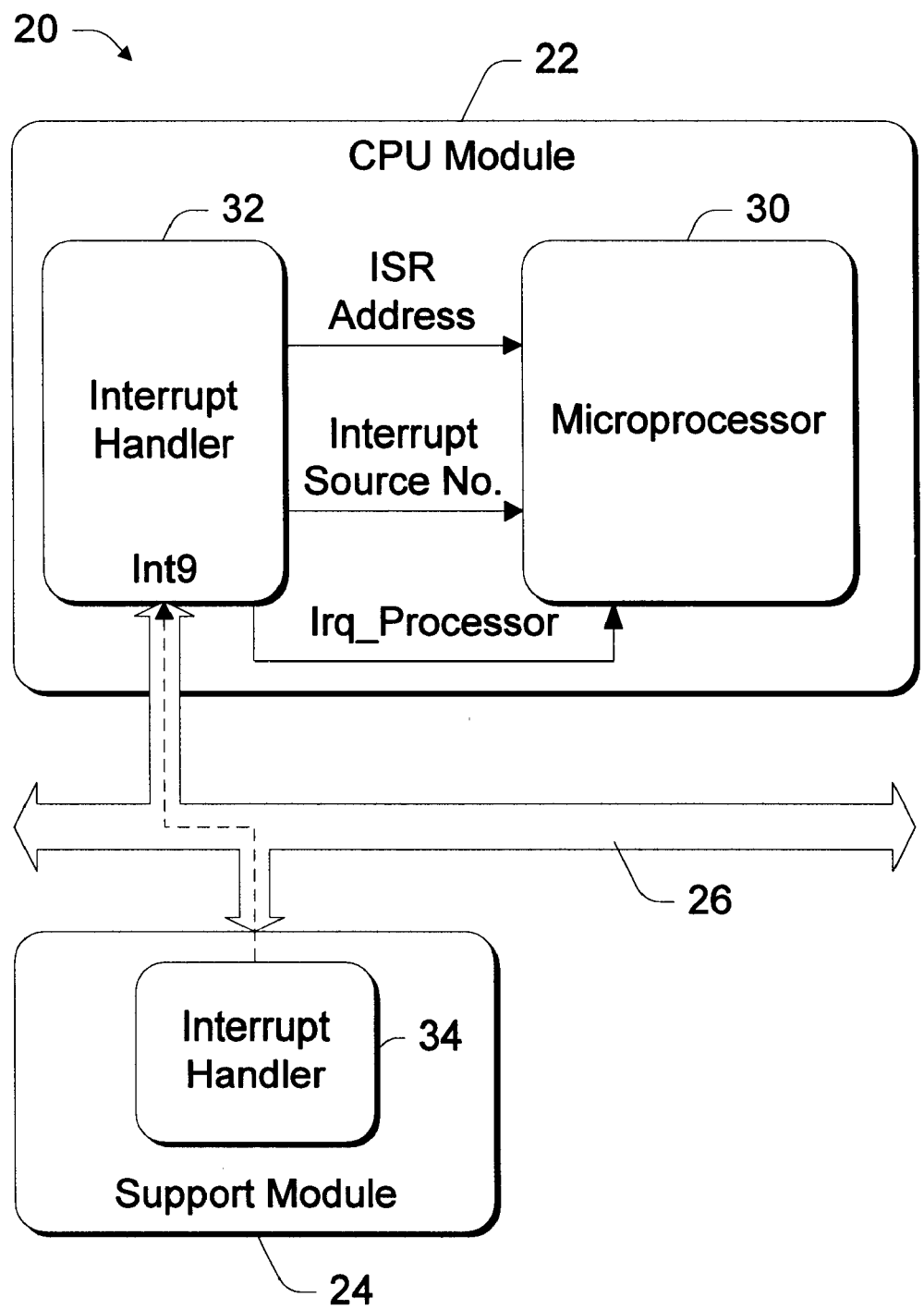
FIG. 1 is a block diagram of a modular computer system with two interrupt handlers arranged in a cascaded relationship.

FIG. 1 shows a computer system 20 having a CPU (central processing unit) module 22 and at least one support module 24. A bus structure 26 (e.g., PCI bus) interconnects the CPU module 22 and the support module 24. The CPU module 22 has a microprocessor 30 and an interrupt handler 32 for handling interrupts or exceptions destined for the microprocessor. The interrupt handler 32 is constructed in hardware external to the microprocessor 30.

The interrupt handler 32 receives one or more interrupts from different sources, evaluates the priorities of the interrupts, and derives servicing information for the highest priority interrupt. The interrupt handler 32 passes the servicing information and interrupt source number to the microprocessor 30 for servicing. The interrupt handler 32 implements a prioritized interrupt vector generator that enables the user to program the interrupt priorities and servicing information as desired.

The CPU module 22, by itself, is generally representative of an embedded processor device. Aspects of this invention are directed to the interrupt handler and to embedded processor devices that incorporate the interrupt handler.

In addition, aspects of this invention concern the entire computer system 20, whereby multiple interrupt handlers are arranged in a cascaded architecture. For instance, in the illustrated example, the support module 24 has an interrupt handler 34 that handles its own interrupts, evaluates the priorities of the interrupts, and passes its highest priority interrupt to the CPU-based interrupt handler 32. In the illustrated example, the CPU-based interrupt handler 32 receives the interrupt from the remote interrupt handler 34 as one of many interrupts (e.g., Int9). The CPU-based interrupt handler 32 then evaluates the interrupt according to its own priorities. In this manner, the interrupt handler architecture is extensible to multiple interrupt handlers, thereby enabling the architecture to quickly handle large numbers of interrupts.

The computer system 20 is representative of many different computing systems, including general-purpose computers and dedicated computing devices. As one particular example, computer system 20 can be implemented as a modular vehicle computer as described in U.S. Pat. No. 5,794,164, entitled "Vehicle Computer System", which issued Aug. 11, 1998, in the names of Richard D. Beckert, Mark Moeller, and William Wong and is assigned to Microsoft Corporation. The vehicle computer has three modules—a computer module, a support module, and a faceplate module—two of which are shown. The computer module mounts in the vehicle dashboard or other location and runs an operating system to support vehicle-related applications and provide additional functionality typically afforded by a personal computer. The support module contains, for example, a storage drive (which also functions as an entertainment player), power supply, a communications bus, an AM/FM tuner, a DSP audio processor and a CODEC. The faceplate module (not shown) includes a display, a keypad and an IrDA interface. The drivers for all hardware components run in the host microprocessor 30.

In the context of the vehicle computer, the remote interrupt handler 34 handles interrupts from the components supported by the support module 24, such as the storage drive and DSP audio processor. The CPU-based interrupt handler 32 handles interrupts directed toward the computer processor on the CPU module 22, such as interrupts from software and hardware sources as well as interrupts received from the remote interrupt handler 34 on the support module 24.

Interrupt Handler

Figure 2:
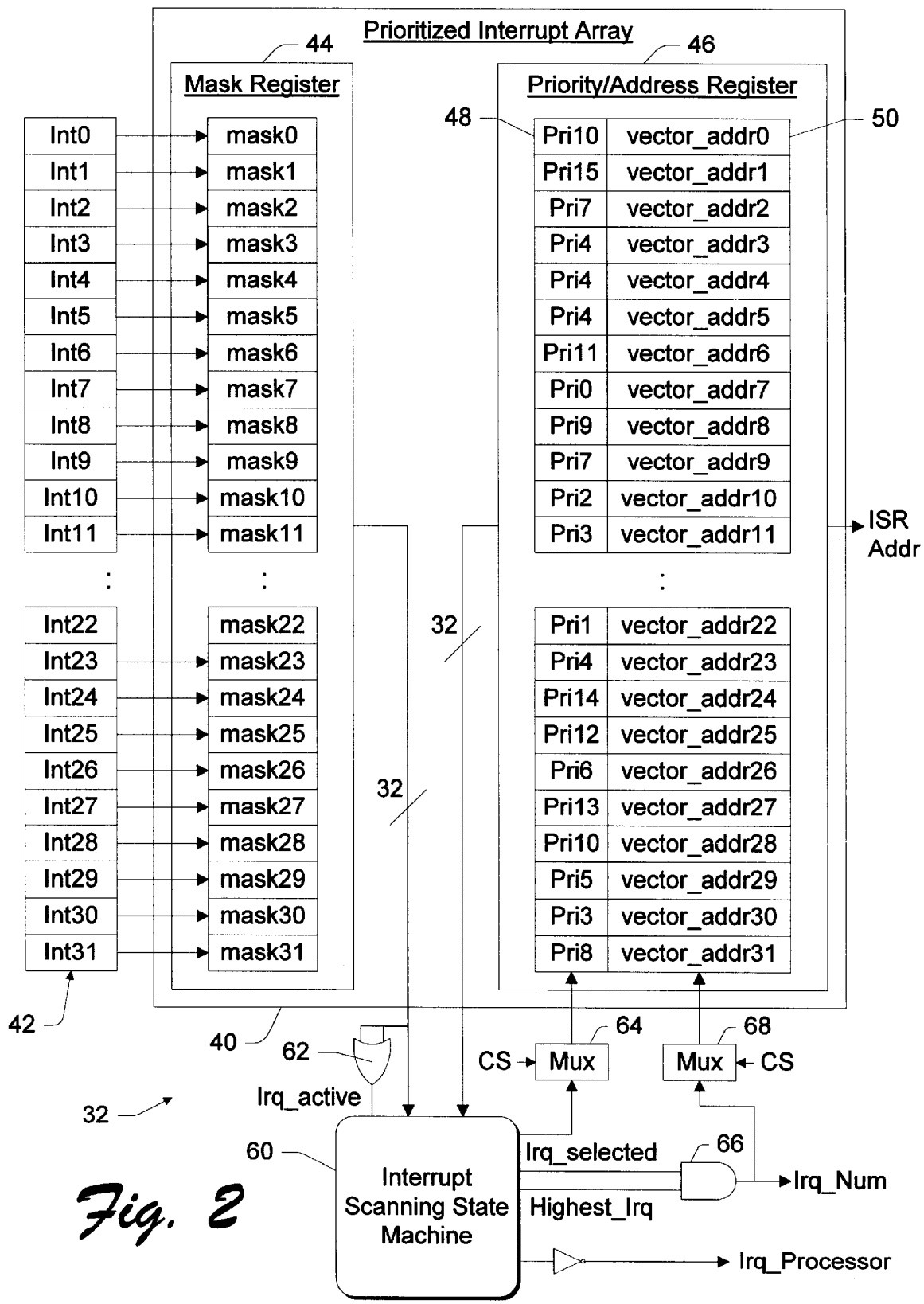
FIG. 2 is a block diagram of an interrupt handler.

FIG. 2 shows the interrupt handler 32 in more detail. Interrupt handler 34 is constructed in a similar manner, and thus only one handler is described. The interrupt handler includes an N-dimensional prioritized interrupt array 40 constructed as hardware register. In the illustrated example, the interrupt array 40 has thirty-two entries (i.e., N=32). The array 40 receives N interrupts 42, as represented by interrupts Int0–Int31, from various sources that provide interrupts to the microprocessor 30.

The prioritized interrupt array 40 is partitioned into a mask register 44 and a priority/address register 46. The registers each have N slots or entries that are associated within one another via the physical hardware structure. The mask register 44 is an N×A register having one entry for each associated interrupt source 42. Each entry holds a mask value that indicates whether the associated interrupt is enabled. In one exemplary implementation, the mask register 42 is a 32×1-bit register (i.e., N=32 and A=1) whereby each interrupt source is allotted an an associated mask bit, represented by values mask0–mask31. The mask bit is active (i.e., a binary "1") if the interrupt is enabled and inactive (i.e., a binary "0") if the interrupt is disabled.

The priority/address register 46 is an N×(B+C) register having one entry for each associated interrupt source 42 and each corresponding entry in the mask register 44. Each entry in the priority/address register 46 contains a B-bit priority field 48 that holds a priority level of the associated interrupt 42 and a C-bit address field 50 that holds servicing information to servicing the associated interrupt.

In the exemplary implementation, the priority field 48 holds a five bit value (i.e., B=5) ranging from Pri0 (highest priority) to Pri31 (lowest priority) for each of the interrupt sources. Different interrupt sources may be assigned the same priority level. For example, interrupts Int3, Int4, and Int5 all have a priority Pri4. The address field 50 holds a 32-bit address (i.e., C=32) that specifies a start address for an interrupt service routine (ISR) that can be invoked to service the associated interrupt.

It is noted that the prioritized interrupt array 40 is expandable to have more or less than N slots and the bit sizes of the registers may vary depending upon the desired implementation. Furthermore, the priority/address register 46 may hold values other than ISR addresses. For instance, in the cascaded architecture described below, the address field 50 in the CPU-based interrupt handler 32 may hold an address received from the remote interrupt handler 34 on the support module 24 which is the highest priority interrupt from the remote interrupt handler 34.

The interrupt handler 32 also has an interrupt scanning state machine 60 that scans the prioritized interrupt array 40 for all active interrupt sources. More particularly, when the interrupt handler 32 receives one or more of the interrupts that are specified by the mask register 44 as being enabled, an OR gate 62 produces an interrupt active signal "Irq_active" that starts the scanning state machine 60. The scanning state machine scans the priority field 48 of the priority/address register 46 using mutiplexer 64 to discern what priority levels are associated with the active interrupts. Upon locating an active interrupt and its associated priority level, the state machine continues scanning for other active interrupts to see if there is still a higher interrupt pending. If two or more active interrupts have the same priority, the state machine will process the first interrupt source encountered in its scanning.

Upon determining the highest-priority active interrupt source to be serviced, the state machine 60 asserts three signals: (1) a "Irq_selected" signal indicating that a certain interrupt has been selected; (2) a "Highest_Irq" signal indicating that the selected interrupt is currently the highest priority; and (3) a "Irq_processor" signal that interrupts the processor 30. When both the "Irq_selected" signal and the "Highest_Irq" signal are asserted, an AND gate 66 outputs the interrupt source number "Irq_Num". A multiplexer 68 uses the source number to locate the corresponding vector address for the ISR from the address field 50 of the priority/address register 46.

The interrupt handler 32 passes the interrupt source number and the vector address for the ISR to the processor. Upon receiving the interrupt signal "Irq_Processor", the processor simply jumps to the address specified in the vector supplied by the interrupt handler 32. The output of scanning state machine 60 remains fixed until the interrupt service routine executed by the processor clears (resets) the interrupt source. At that time, the state machine will become active again, searching for a next highest priority interrupt to be serviced.

Operation

Figure 3:
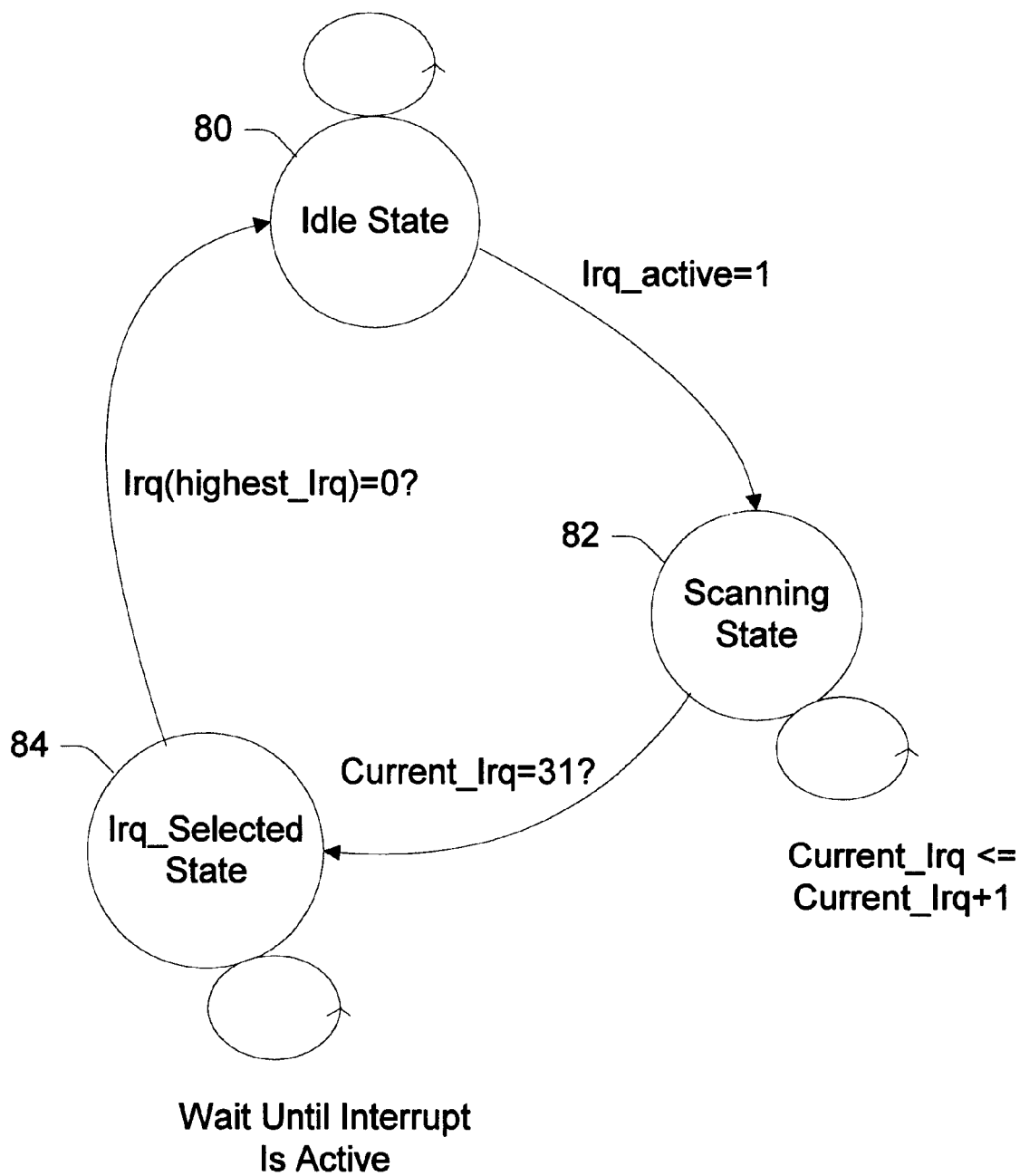
FIG. 3 a state diagram implemented by the interrupt handler.

FIG. 3 is a state diagram showing a scanning process controlled by the scanning state machine 60. When no interrupts are active, the state machine 60 sits in an Idle State 80. When one or more enabled interrupts go active and the OR gate 62 outputs an interrupt active signal (i.e., Irq_active=1), the state machine enters a Scanning State 82.

For discussion purposes, suppose that the interrupt handler 32 receives three interrupts: "Int6", "Int11", and "Int30". Further, suppose that corresponding mask values "mask6", "mask11", and "mask30" in mask register 44 indicate that all three interrupts are enabled.

In the Scanning State 82, the state machine 60 scans the priority field 48 of the priority/address register 46 to determine which of the active interrupts has the highest programmed priority value. The state machine begins at the top of the array 40 and cycles through to the bottom to locate the interrupt source with the highest priority. The state machine initializes a "Current_Irq" count to zero, and sequentially steps through the array by incrementing by one the "Current_Irq".

In this example, the state machine first encounters the priority level "Pri11" for interrupt source "Int6". Thus far, this interrupt is initially considered to be the highest priority. The state machine 60 continues scanning until reaching the priority level "Pri3" of the next active interrupt "Int11". Priority level "Pri3" is higher than priority level "Pri11" and hence the state machine substitutes, the priority level "Pri3" as the highest priority.

Once again, the state machine 60 continues scanning until reaching the priority level "Pri3" of the third and final active interrupt "Int30". Notice that this interrupt source has the same priority level as the previous interrupt source. In this case, the scanning state machine 60 keeps the first-encountered interrupt source "Int11" as the highest priority interrupt. In this manner, the state machine 60 remembers the first-encountered interrupt source with the highest priority level.

After all sources have been scanned (i.e., Current_Irq= 31), the state machine transitions to an Interrupt Selected State 84. The state machine asserts the "Irq_Selected" signal and the "Highest_Irq" so that the AND gate 66 outputs the interrupt source number "Irq_Num" of the highest priority interrupt to be serviced. The multiplexor 68 locates the vector address in field 50 of the priority/address register 46 that corresponds to the highest priority interrupt and outputs that address. Here, the vector address "vector_addr11" is an address of the interrupt service routine corresponding to interrupt "Int11". The state machine 60 asserts the processor interrupt "Irq_Processor" and provides the interrupt source number "Int11" and corresponding vector address "vector_addr11" as outputs for the processor to read.

The state machine 60 stays in the Interrupt Selected State 84 until the interrupt "Int11" is inactive once again. The state machine then returns to the Idle State 80 and determines whether any enabled interrupts are active. In this example, interrupts "Int6" and "Int30" are still active and perhaps new interrupts have become active since the last scan. Therefore, the state machine 60 transitions immediately to the Scanning State 82 to locate the interrupt with the highest priority.

Cascaded Architecture

As noted above, multiple interrupt handlers may be arranged in a cascaded architecture where the output of one interrupt handler becomes an interrupt source to a next interrupt handler. For instance, in FIG. 1, the output of the interrupt handler 34 on support module 24 becomes interrupt source "Int9" of the interrupt handler 32 on CPU module 22.

Figure 4:
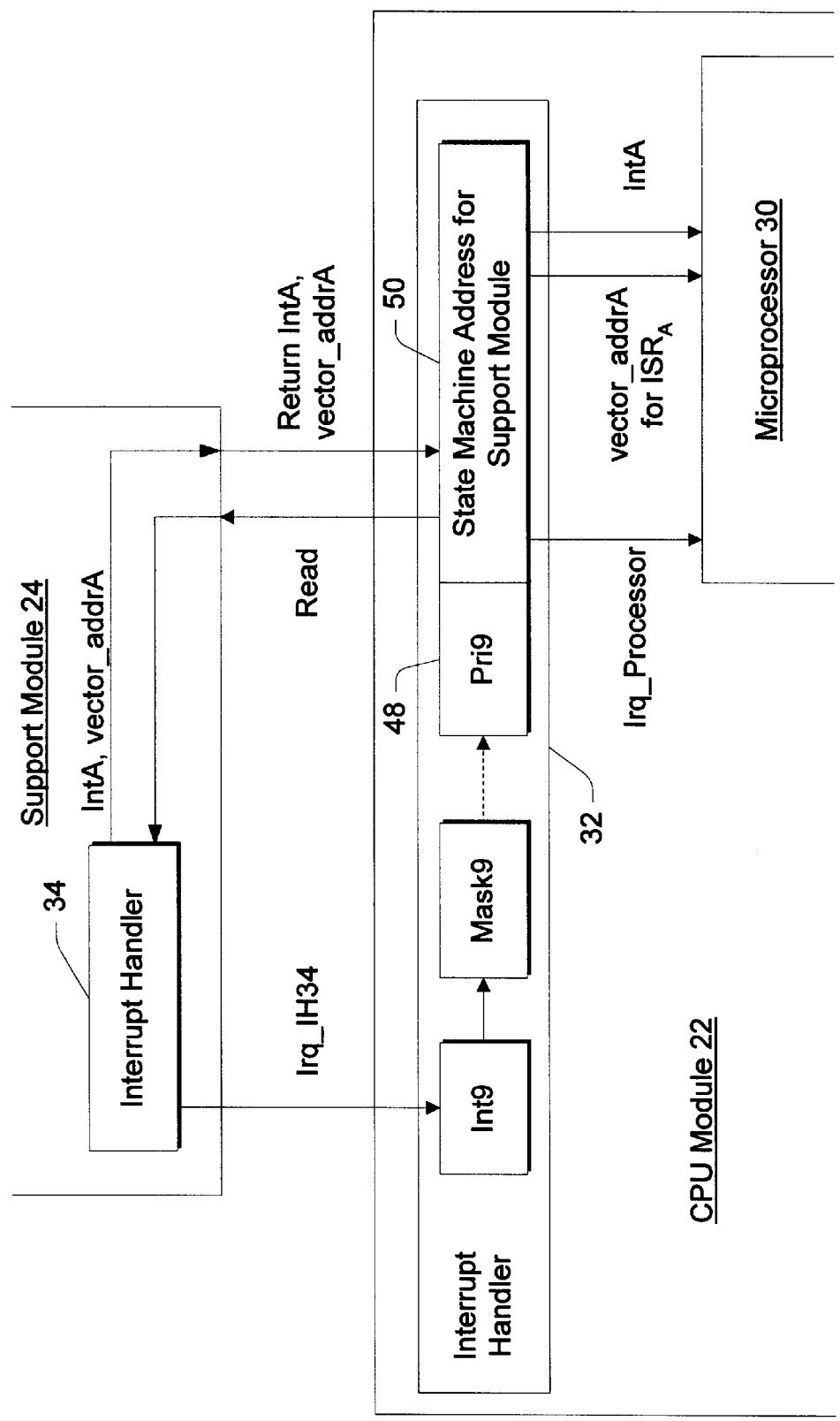
FIG. 4 is a flow diagram illustrating the process of handing an interrupt via the cascaded interrupt handlers.

FIG. 4 shows the cascaded architecture in more detail and describes its operation. Suppose that the interrupt handler 34 of support module 24, through its own internal scanning operation like that described above with respect to FIG. 3, determines that the interrupt source "IntA" is the highest priority interrupt currently pending. The remote interrupt handler 34 temporarily stores the interrupt source "IntA" and corresponding address "vector_addrA" for servicing the interrupt. The remote interrupt handler 34 then outputs an interrupt signal "Irq_IH34", which is received at the CPU-based interrupt handler 32 as interrupt source "Int9".

Assuming that the interrupt "Int9" is enabled (i.e., as indicated by mask9 in interrupt handler 32), the scanning state machine 60 of interrupt handler 32 scans the priority field 48 to locate the highest priority active interrupt. Assuming that only interrupt "Int9" is active or that it is the highest priority among active interrupts, the state machine 60 scans the address field 50 to locate a corresponding address.

In this case, the address field 50 holds an address for the state machine in the remote interrupt handler 34. Upon finding this address, the CPU-based interrupt handler 32 starts a bus cycle on bus 26 to read the information currently being held at the remote interrupt handler 34 that corresponds to the interrupt source "IntA". The CPU-based interrupt handler 32 then outputs the interrupt source "IntA" and corresponding address "vector_addrA" to the processor 30 for servicing.

Programming Prioritized Interrupt Array

The prioritized interrupt array 40 is programmable to set the interrupt priority levels in field 48 and the corresponding information in field 50 for servicing the interrupts. To program the priority field 48, an external chip select (CS) signal is applied to multiplexer 64 by the microprocessor 30 to locate the particular priority slot and a five-bit value is written to the slot using standard I/O or memory-write instructions. Similarly, to program the address field 50, an external chip select (CS) signal is applied to multiplexer 68 by the microprocessor 30 to locate the particular address slot and a 32-bit value is written to the slot.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An interrupt handler for handling interrupts, comprising:

a programmable prioritized interrupt array that stores priority levels for associated interrupts and information for handling the associated interrupt; and a dynamic interrupt scanning state machine that scans the prioritized interrupt array upon receipt of one or more interrupts to locate the interrupt with a highest priority and identify the information for handling the interrupt with the highest priority.

2. An interrupt handler as recited in claim 1, wherein the information comprises addresses to interrupt service routines for servicing the associated interrupts.

3. A computer comprising:
a processor; and
an interrupt handler as recited in claim 1 to handle interrupts for the processor.

4. A vehicle computer for a vehicle comprising an interrupt handler as recited in claim 1.

5. A vehicle computer for a vehicle, comprising:
a CPU module with a processor and a first interrupt handler constructed as the interrupt handler recited in claim 1 to handle interrupts for the processor;
a bus connected to the CPU module; and
a support module connected to the bus, the support module having a second interrupt handler constructed as the interrupt handler recited in claim 1, the second interrupt handler supplying a highest priority interrupt derived at the support module as one of the interrupts handled by the first interrupt handler on the CPU module.

6. An interrupt handler for handling interrupts, comprising:
a programmable prioritized interrupt array that stores priority levels for associated interrupts and information for handling the associated interrupt; and
an interrupt scanning state machine that scans the prioritized interrupt array upon receipt of one or more interrupts to locate the interrupt with a highest priority and identify the information for handling the interrupt with the highest priority, wherein the information comprises at least one address to a remote interrupt handler.

7. An interrupt handler for handling interrupts, comprising:
a programmable prioritized interrupt array that stores priority levels for associated interrupts and information for handling the associated interrupt; and
an interrupt scanning state machine that scans the prioritized interrupt array upon receipt of one or more interrupts to locate the interrupt with a highest priority and identify the information for handling the interrupt with the highest priority, wherein the prioritized interrupt array may be programmed such that multiple different interrupts have identical priority levels.

8. An interrupt handler for handling interrupts, comprising:
a programmable prioritized interrupt array that stores priority levels for associated interrupts and information for handling the associated interrupt; and
an interrupt scanning state machine that scans the prioritized interrupt array upon receipt of one or more interrupts to locate the interrupt with a highest priority and identify the information for handling the interrupt with the highest priority, wherein the interrupt scanning state machine scans the prioritized interrupt array sequentially.

9. An interrupt handler for handling interrupts, comprising:
a programmable prioritized interrupt array that stores priority levels for associated interrupts and information for handling the associated interrupt; and an interrupt scanning state machine that scans the prioritized interrupt array upon receipt of one or more interrupts to locate the interrupt with a highest priority and identify the information for handling the interrupt with the highest priority, wherein if the prioritized interrupt array locates an interrupt before scanning all of the prioritized interrupt array, the interrupt scanning state machine continues scanning until all of the prioritized interrupt array has been scanned to ensure that the interrupt with the highest priority is located.

10. An interrupt handler for handling interrupts, comprising:
a programmable prioritized interrupt array that stores priority levels for associated interrupts and information for handling the associated interrupt, wherein the prioritized interrupt array comprises:
a mask register to hold mask values for corresponding ones of the interrupts to indicate whether the interrupts are enabled; and
a priority/address register having a priority field to hold priority levels for the interrupts and an address field to hold addresses to interrupt service routines for servicing the associated interrupts; and
an interrupt scanning state machine that scans the prioritized interrupt array upon receipt of one or more interrupts to locate the interrupt with a highest priority and identify the information for handling the interrupt with the highest priority.

11. An interrupt handler for handling interrupts, comprising:
a programmable prioritized interrupt array that stores priority levels for associated interrupts and information for handling the associated interrupt; and
an interrupt scanning state machine that scans the prioritized interrupt array upon receipt of one or more interrupts to locate the interrupt with a highest priority and identify the information for handling the interrupt with the highest priority, wherein the interrupt scanning state machine is initially in an idle state until the prioritized interrupt array receives one or more interrupts; and whereupon receipt of the one or more interrupts, the interrupt scanning state machine transitions to a scanning state to scan the prioritized interrupt array and identify which of the one or more interrupts has a highest priority; and whereupon identifying the interrupt with the highest priority, the interrupt scanning state machine transitions to an interrupt selected state and accesses the prioritized interrupt array to output the information for handling the interrupt with the highest priority.

12. An interrupt handler for handling interrupts, comprising:
a programmable prioritized interrupt array for receiving one or more interrupts from multiple interrupt sources, the prioritized interrupt array having:
a mask register to hold mask values for corresponding interrupt sources to indicate whether the interrupts from the interrupt sources are enabled;
a priority register to hold priority levels for the interrupts received from the corresponding interrupt sources;
an address register to hold information for handling the interrupts received from the corresponding interrupt sources;
an interrupt scanning state machine coupled to the prioritized interrupt array, the interrupt scanning state machine remaining in an idle state until the prioritized interrupt array receives one or more active interrupts that are indicated by the mark register as being enabled;
whereeupon receipt of the one or more active interrupts, the interrupt scanning state machine transitions to a scanning state to scan the priority register and identify which of the one or more active interrupts has a highest priority; and whereupon identifying the active interrupt with the highest priority, the interrupt scanning state machine transitions to an interrupt selected state and accesses the address register to output information for handling the active interrupt with the highest priority.

13. An interrupt handler as recited in claim 12, wherein the address register holds addresses to interrupt service routines for servicing the interrupts received from the corresponding interrupt sources.

14. An interrupt handler as recited in claim 12, wherein the address register holds at least one address to a remote interrupt handler.

15. An interrupt handler as recited in claim 12, wherein the priority register and the address register are programmable.

16. An interrupt handler as recited in claim 12, wherein the interrupt scanning state machine scans the priority register sequentially.

17. A computer comprising:
a processor; and
an interrupt handler as recited in claim 12 to handle interrupts for the processor.

18. A vehicle computer for a vehicle comprising an interrupt handler as recited in claim 12.

19. A computing device comprising:
a processor;
an interrupt handler implemented in hardware and external to the processor to handle interrupts destined for the processor, the interrupt handler having programmable registers that define (1) whether interrupts from particular interrupt sources are enabled, (2) priority levels of the interrupts, and (3) information for handling the interrupts; and
upon receiving one or more interrupts, the interrupt handler through a dynamic state machine identifies a highest priority from among the one or more interrupts and provides an interrupt source identity and handling information for the highest priority interrupt to the processor.

20. A computing device as recited in claim 19, stores addresses to interrupt service routines for servicing the interrupts.

21. A computing device as recited in claim 19, embodied as a vehicle computer designed to reside in a vehicle.

22. A computer system comprising:
a bus;
a computing device as recited in claim 19 coupled to the bus; and
a remote interrupt handler coupled to the bus to supply an external interrupt to the intedrrupt handler of the computing device.

23. A computing device comprising:
a processor;
an interrupt handler implemented in hardware and external to the processor to handle interrupts destined for the processor, the interrupt handler having programmable registers that define (1) whether interrupts from particular interrupt sources are enabled, (2) priority levels of the interrupts, and (3) information for handling the interrupts; and
upon receiving one or more interrupts, the interrupt handler identifies a highest priority from among the one or more interrupts and provides an interrupt source identity and handling information for the highest priority interrupt to the processor, wherein multiple different interrupts are assigned with identical priority levels.

24. A computing device comprising:
a processor;
an interrupt handler implemented in hardware and external to the processor to handle interrupts destined for the processor, the interrupt handler having programmable registers that define (1) whether interrupts from particular interrupt sources are enabled, (2) priority levels of the interrupts, and (3) information for handling the interrupts; and
upon receiving one or more interrupts, the interrupt handler identifies a highest priority from among the one or more interrupts and provides an interrupt source identity and handling information for the highest priority interrupt to the processor, wherein the interrupt handler comprises:
a programmable prioritized interrupt array that interrelates the programmable registers in a data structure; and
an interrupt scanning state machine that scans the prioritized interrupt array upon receipt of the one or more interrupts.

25. A computing device as recited in claim 24, wherein the interrupt scanning state machine is initially in an idle state until the prioritized interrupt array receives the one or more interrupts; and whereupon receipt of the one or more interrupts, the interrupt scanning state machine transitions to a scanning state to scan the prioritized interrupt array and identify which of the one or more interrupts has a highest priority; and whereupon identifying the interrupt with the highest priority, the interrupt scanning state machine transitions to an interrupt selected state and accesses the prioritized interrupt array to output the information for handling the interrupt with the highest priority.

26. A computing device comprising:
a processor;
an interrupt handler implemented in hardware and external to the processor to handle interrupts destined for the processor, the interrupt handler having programmable registers that define (1) whether interrupts from particular interrupt sources are enabled, (2) priority levels of the interrupts, and (3) information for handling the interrupts; and
upon receiving one or more interrupts, the interrupt handler identifies a highest priority from among the one or more interrupts and provides an interrupt source identity and handling information for the highest priority interrupt to the processor, wherein one of the interrupt sources is a remote interrupt handler.

27. A method for handling interrupts comprising:
awaiting receipt of one or more interrupts;
upon receipt of the one or more interrupts, scanning using a dynamic state machine a prioritized interrupt array to determine which interrupt has a highest priority; and
upon identifying the interrupt with the highest priority, accessing the prioritized interrupt array to obtain information for handling the interrupt with the highest priority.

28. A method for handling interrupts comprising:
awaiting receipt of one or more interrupts;
upon receipt of the one or more interrupts, scanning a prioritized interrupt array to determine which interrupt has a highest priority;
upon identifying the interrupt with the highest priority, accessing the prioritized interrupt array to obtain infortnation for handling the interrupt with the highest priority; and
repeating the scanning and the accessing until all of the one or more interrupts have been handled.

* * * * *

UNITED STATES PATENT AND TRADEMARK OFFICE
CERTIFICATE OF CORRECTION

PATENT NO.    : 6,499,078 B1
DATED         : December 24, 2002
INVENTOR(S)   : Beckert et al.

It is certified that error appears in the above-identified patent and that said Letters Patent is hereby corrected as shown below:

<u>Column 4,</u>
Line 12, delete the second occurrence of "an".

<u>Column 8,</u>
Line 66, replace "whereeupon" with -- whereupon --.

<u>Column 9,</u>
Line 52, replace "intedrrupt" with -- interrupt --.

<u>Column 10,</u>
Lines 61 and 62, replace "infortnation" with -- information --.

Signed and Sealed this

Eleventh Day of March, 2003

JAMES E. ROGAN
*Director of the United States Patent and Trademark Office*